(12) United States Patent
Liu

(10) Patent No.: US 12,160,905 B2
(45) Date of Patent: Dec. 3, 2024

(54) METHOD AND DEVICE FOR SENDING RANDOM ACCESS MESSAGE, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 396 days.

(21) Appl. No.: 17/630,302

(22) PCT Filed: Aug. 2, 2019

(86) PCT No.: PCT/CN2019/099053
§ 371 (c)(1),
(2) Date: Jan. 26, 2022

(87) PCT Pub. No.: WO2021/022408
PCT Pub. Date: Feb. 11, 2021

(65) Prior Publication Data
US 2022/0272768 A1  Aug. 25, 2022

(51) Int. Cl.
| | |
|---|---|
| *H04L 1/08* | (2006.01) |
| *H04W 52/36* | (2009.01) |
| *H04W 72/0446* | (2023.01) |
| *H04W 74/00* | (2009.01) |
| *H04W 74/08* | (2009.01) |
| *H04W 74/0833* | (2024.01) |

(52) U.S. Cl.
CPC ........... *H04W 74/0841* (2013.01); *H04L 1/08* (2013.01); *H04W 52/362* (2013.01); *H04W 52/367* (2013.01); *H04W 72/0446* (2013.01); *H04W 74/004* (2013.01); *H04W 74/0866* (2013.01)

(58) Field of Classification Search
CPC .... H04L 1/08; H04W 52/352; H04W 52/357; H04W 74/004
USPC ................................ 370/329, 400, 401, 395
See application file for complete search history.

(56) References Cited

U.S. PATENT DOCUMENTS

| 11,218,954 | B2* | 1/2022 | Kim ...................... H04W 76/11 |
| 2020/0225655 | A1* | 7/2020 | Cella ................ G05B 19/41875 |

OTHER PUBLICATIONS

Huawei et al.: "Further discussion on 2-step RACH procedure", R1-1903924, 3GPP TSG RAN WG1 Meeting #96BIS, Apr. 12, 2019, 4 pages.

(Continued)

*Primary Examiner* — Dang T Ton
(74) *Attorney, Agent, or Firm* — Cozen O'Connor

(57) ABSTRACT

A method and a device for sending a random access message in a wireless communication network includes: sending a first random access message based on a first retransmission configuration in a two-step random access process, in which the first random access message includes a physical random access channel (PRACH) and a physical uplink shared channel (PUSCH); and sending specified content based on a second retransmission configuration in response to meeting a condition of sending the specified content, in which the specified content is content of the first random access message in the PUSCH; the first retransmission configuration being different from the second retransmission configuration.

20 Claims, 2 Drawing Sheets

---

301  sending a first random access message to a base station, the first random access message includes content sent on a physical random access channel (PRACH) and content sent on a physical uplink shared channel (PUSCH)

302  if a second random access message of a specified type returned by the base station is received within a first specified time period, sending a specified content to the base station, the specified content is the content of the first random access message in the PUSCH 303  if the second random access message returned by the base station is not received within a second specified time period after the specified content is sent and the number of times of retransmission of the specified content does not reach the second number of times of retransmission, sending the specified content to the base station repeatedly 304  if the second random access message returned by the base station is not received within the first specified time period and the number of times of retransmission of the first random access message does not reach the first number of times of retransmission, retransmitting the first random access message to the base station

(56) References Cited

OTHER PUBLICATIONS

Huawei et al.: "Discussion on 2-step RACH procedure", R1-1906051, 3GPP TSG RAN WG1 Meeting #97, May 17, 2019, 12 pages.
CAICT: "Consideration on Procedure for Two-step RACH", R1-1907197, 3GPP TSG RAN WG1 Meeting #97, May 17, 2019, 8 pages.
PCT/CN2019/099053 International Search Report, dated Apr. 26, 2021, 2 pages.

* cited by examiner

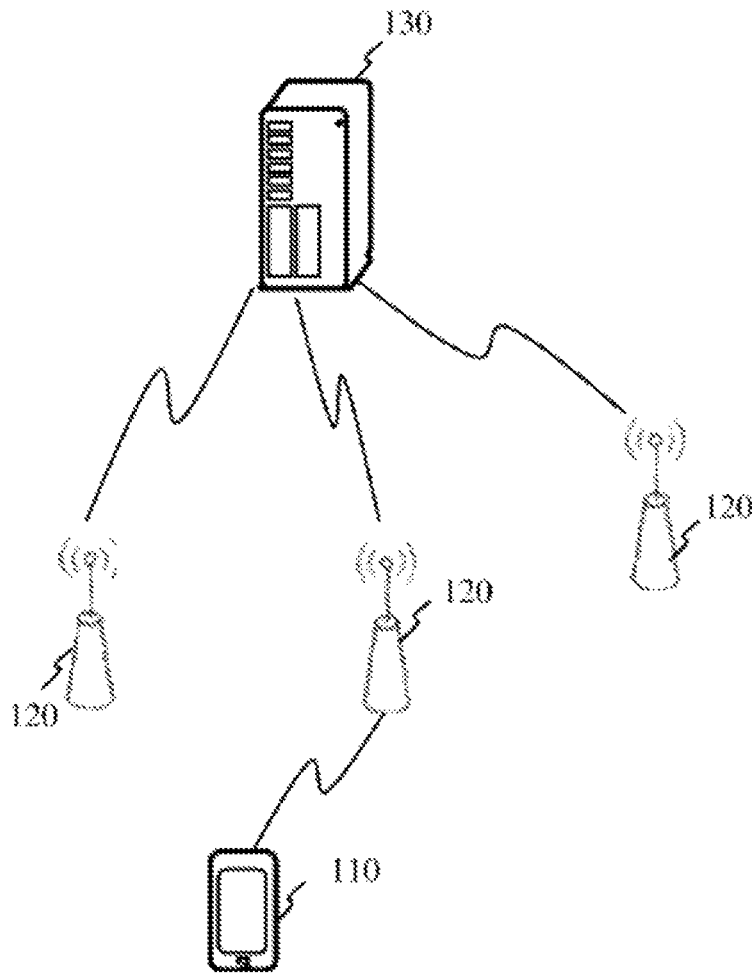

FIG. 1

| sending a first random access message based on a first retransmission configuration in a two-step random access process, wherein the first random access message comprises a physical random access channel (PRACH) and a physical uplink shared channel (PUSCH) | 201 |

| sending specified content based on a second retransmission configuration in response to meeting a condition of sending the specified content, the specified content is content of the first random access message in the PUSCH and the first retransmission configuration is different from the second retransmission configuration | 202 |

FIG. 2

METHOD AND DEVICE FOR SENDING RANDOM ACCESS MESSAGE, AND STORAGE MEDIUM

CROSS-REFERENCE TO RELATED APPLICATION

This application is a national phase application of International Application No. PCT/CN2019/099053, filed on Aug. 2, 2019, the entire contents of which are hereby incorporated by reference for all purposes.

TECHNICAL FIELD

The disclosure relates to a field of wireless communication technologies, and particularly to a method and a device for sending a random access message, and a storage medium.

BACKGROUND

In the cellular mobile communication technology, there is an increasing demand to transmit greater quantities of mobile data, which has led to the development of the cellular mobile communication technology referred to as the new ratio (NR) system, or 5G.

In the NR system, a terminal may initiate access to a base station in a two-step random access mode.

SUMMARY

The disclosure provides a method and a device for sending a random access message, and a storage medium. The technical solution will be described below.

According to a first aspect of the embodiments of the disclosure, a method for sending a random access message is provided. The method is performed by a terminal and includes: sending a first random access message based on a first retransmission configuration in a two-step random access process, in which the first random access message comprises a physical random access channel (PRACH) and a physical uplink shared channel (PUSCH); and sending specified content based on a second retransmission configuration in response to meeting a condition of sending the specified content, in which the specified content is content of the first random access message in the PUSCH. The first retransmission configuration is different from the second retransmission configuration.

According to a second aspect of the embodiments of the disclosure, a device for sending a random access message is provided. The device is applied in a terminal and includes: a processor and a memory storing executable instructions thereon. The processor is configured to perform the following: sending a first random access message based on a first retransmission configuration in a two-step random access process, in which the first random access message comprises a physical random access channel (PRACH) and a physical uplink shared channel (PUSCH); and sending specified content based on a second retransmission configuration in response to meeting a condition of sending the specified content, in which the specified content is content of the first random access message in the PUSCH. The first retransmission configuration is different from the second retransmission configuration.

According to a third aspect of the embodiments of the disclosure, a non-transitory computer-readable storage medium stored with executable instructions thereon is provided. The executable instructions are loaded and executed by a processor, to perform the method for sending a random access message according to the first aspect or any implementation of the first aspect.

It is to be understood that both the foregoing general description and the following detailed description are exemplary and explanatory only, and are not restrictive of the present disclosure, as claimed.

BRIEF DESCRIPTION OF THE DRAWINGS

To illustrate the solutions according to the embodiments of the present disclosure or in the prior art more clearly, accompanying drawings needed for describing the embodiments or the prior art are briefly introduced below. The accompanying drawings in the following descriptions are merely some embodiments of the present disclosure, and persons of ordinary skill in the art may obtain other drawings according to the accompanying drawings without making creative efforts.

FIG. 1 is a schematic diagram illustrating a wireless communication system according to an embodiment of the present disclosure.

FIG. 2 is a flowchart illustrating a method for sending a random access message according to another embodiment;

DETAILED DESCRIPTION

Figure 3:
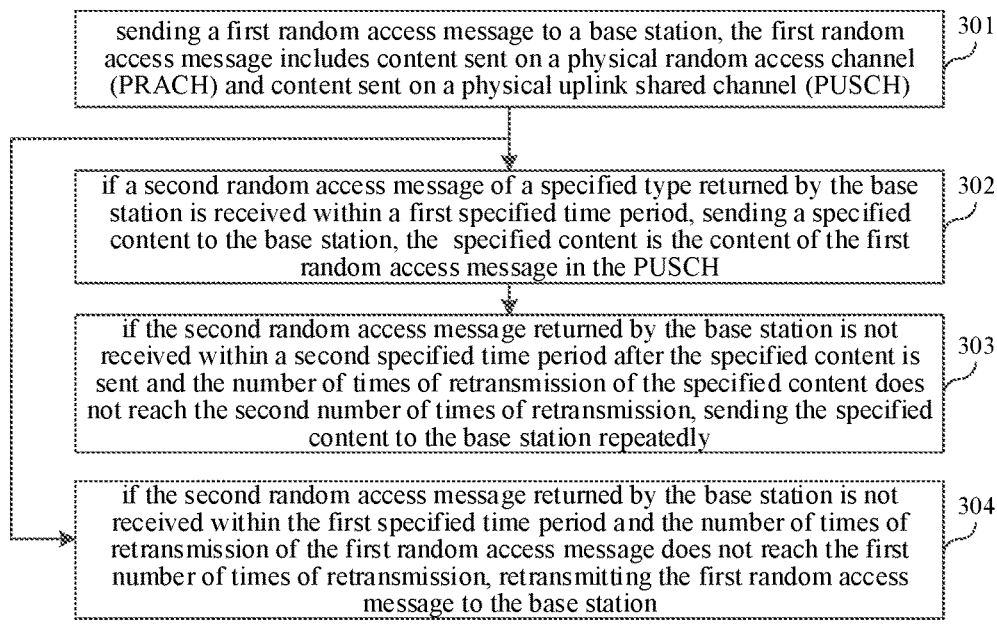
FIG. 3 is a flowchart illustrating a method for sending a random access message according to another embodiment.

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

It should be understood that "several" mentioned in the disclosure refers to one or more, and "a plurality of" refers to two or more. The term "and/or" describes an association relationship among the associated objects, indicating that there are three types of relationships, for example, A and/or B, i.e., A alone exists, A and B exist at the same time, and B exists alone. The character "/" generally indicates that the associated objects before and after are in an "or" relationship. To facilitate understanding, some application scenarios involved in the disclosure will be briefly introduced below.

With development of the wireless communication technologies, the quantity mobile data transmitted through the network rapidly increasing. In order to satisfy a communication requirement with ever-increasing mobile data, a two-step random access method of the fifth-generation (5G) mobile communication technology, i.e., the new radio (NR) technology, is developed.

FIG. 1 is a schematic diagram illustrating a wireless communication system according to an embodiment of the present disclosure. As illustrated in FIG. 1, the mobile communication system is a communication system based on the cellular mobile communication technology. The mobile communication system may include several terminals 110 and several base stations 120.

The terminal 110 may be a device that provides voice and/or data connectivity to a user. The terminal 110 can communicate with one or more core networks via a radio access network (RAN). The terminal 110 can be an IoT terminal, such as a sensor device, a mobile phone (or a cellular phone), and a computer having an IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may also be a device of an unmanned aerial vehicle or the like.

The base station 120 may be a network side device in the wireless communication system. The wireless communication system may be a 5G system, also known as the new radio (NR) system. Alternatively, the wireless communication system may also be a next-generation system of the 5G system.

The base station 120 may be a base station (gNB) adopting a centralized and distributed architecture in the 5G system. When the base station 120 adopts the centralized distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 120.

A wireless connection can be established between the base station 120 and the terminal 110 through a wireless air interface. In different embodiments, the wireless air interface is a wireless air interface based on the 5G standard. For example, the wireless air interface is the NR. Alternatively, the wireless air interface can also be a wireless air interface based on a standard of next generation mobile communication network technology based on the 5G.

Alternatively, the wireless communication system may further include a network management device 130.

A plurality of the base stations 120 are connected to the network management device 130 respectively. The network management device 130 may be a core network device in the wireless communication system. For example, the network management device 130 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 130 is not limited in the embodiment of the disclosure.

In the NR system, when the terminal selects the two-step random access mode, the terminal may send a first random access message (MsgA) to the base station. The base station may return a second random access message (also referred to as MsgB) to the terminal after successfully receiving the MsgA. The MsgA sent by the terminal to the base station is consisted of the PRACH and PUSCH, both of which are transmitted using a time division multiplexing (TDM) technology.

In related art, in the first step of the two-step random access mode, the terminal in the NR system sends a first random access message (MsgA) to a base station. Further, when the base station cannot receive the MsgA completely and a number of times of retransmission of the first random access message does not reach a preset number, the terminal may continue retransmitting the first random access message.

In a possible implementation, when the terminal sends the complete MsgA to the base station, the base station may receive the PRACH of the MsgA and parse the PUSCH of the MsgA due to the TDM. When the base station does not receive the PRACH of the MsgA, or when the base station successfully receives the PRACH of the MsgA but fails to parse the content of the MsgA in the PUSCH, the base station fails to receive the MsgA. In this case, the terminal may retransmit the MsgA. In order to avoid infinite retransmission of the MsgA in cases of poor network conditions and the like, a threshold of the number of times of retransmission is introduced in the technical solution, i.e., a counter is set for the number of times of retransmission of the MsgA. When the counter reaches a specified value, the retransmission of the MsgA is terminated.

However, the above technical solution has the following problems.

The PRACH of the MsgA mainly includes a preamble. The probability of preamble collision in one transmission is low, and the probability that the preamble collision occurs in the second retransmission or even in the third retransmission is even lower. The situation that the base station fails to receive the MsgA is mostly caused by not parsing the content of the MsgA in the PUSCH successfully. When performing the retransmission, the complete MsgA needs to be retransmitted for each time, such that the random access process may occupy many NR resources, thus affecting the resource utilization of the system.

In order to avoid the above problems, the embodiment of the present disclosure provides a method for sending a random access message. FIG. 2 is a flowchart illustrating a method for sending a random access message according to another embodiment. The method for sending a random access message may be applied in the wireless communication system illustrated in FIG. 1 and performed by the terminal illustrated in FIG. 1. The method may include the following.

At block 201, in a two-step random access process, a first random access message is sent based on a first retransmission configuration. The first random access message includes a physical random access channel (PRACH) and a physical uplink shared channel (PUSCH).

At block 202, in response to meeting a condition of sending specified content, the specified content is sent based on a second retransmission configuration. The specified content is a content of the first random access message in the PUSCH. The first retransmission configuration is different from the second retransmission configuration.

Alternatively, the first retransmission configuration includes a first number of times of retransmission corresponding to the first random access message, and sending the first random access message based on the first retransmission configuration includes: sending the first random access message to a base station repeatedly in response to not receiving a second random access message returned by the base station within a first specified time period after the first random access message is sent last time and a number of times of retransmission of the first random access message not reaching the first number of times of retransmission.

Alternatively, sending the first random access message to the base station repeatedly includes: obtaining a first power adjustment step size of the first random access message; obtaining an adjusted first transmitting power by adjusting a first transmitting power for sending the first random access message last time based on the first power adjustment step size; and sending the first random access message repeatedly to the base station based on the adjusted first transmitting power.

Alternatively, obtaining the adjusted first transmitting power by adjusting the first transmitting power for sending the first random access message last time based on the first power adjustment step size includes obtaining the adjusted first transmitting power by adding the first power adjustment step size to the first transmitting power for sending the first random access message last time.

Alternatively, the first power adjustment step size is obtained by dividing a difference between a maximum transmitting power for the terminal sending a random access message and a transmitting power for sending the first random access message for the first time by the first number of times of retransmission.

Alternatively, sending the specified content based on the second retransmission configuration in response to meeting the condition of sending the specified content includes: sending the specified content based on the second retransmission configuration in response to receiving the second random access message of a specified type returned by the base station within the first specified time period after the first random access message is sent last time.

The second random access message of the specified type is a message returned by the base station after successfully receiving the PRACH of the first random access message but failing to parse the content of the first random access message in the PUSCH.

Alternatively, the second retransmission configuration includes a second number of times of retransmission corresponding to the specified content, and the second number of times of retransmission is different from the first number of times of retransmission.

Sending the specified content based on the second retransmission configuration includes: sending the specified content to the base station repeatedly in response to not receiving the second random access message returned by the base station within a second specified time period after the specified content is sent last time and a number of times of retransmission of the specified content not reaching the second number of times of retransmission.

Alternatively, sending the specified content to the base station repeatedly includes: obtaining a second power adjustment step size of the specified content; obtaining an adjusted second transmitting power by adjusting a second transmitting power for sending the specified content last time based on the second power adjustment step size; and retransmitting the specified content to the base station based on the adjusted second transmitting power.

Alternatively, obtaining the adjusted second transmitting power by adjusting the second transmitting power for sending the specified content last time based on the second power adjustment step size includes obtaining the adjusted second transmitting power by adding the second power adjustment step size to the second transmitting power for sending the specified content last time.

Alternatively, the second power adjustment step size is obtained by dividing a difference between a maximum transmitting power for the terminal sending a random access message and a transmitting power for sending the specified content for the first time by the second number of times of retransmission.

Alternatively, the first number of times of retransmission is less than the second number of times of retransmission.

In conclusion, according to the technical solution of the embodiment of the present disclosure, in the two-step random access process initiated by the terminal, the first random access message and the specified content of the first random access message in the PUSCH are sent through different retransmission configurations, respectively, thus realizing optimization of transmission of different message contents in the two-step random access process, and improving a resource utilization of the system.

In addition to optimization of transmission of different message contents in the two-step random access process, the technical solution of the present disclosure may further optimize a transmitting power of the first random access message and the specified content of the first random access message in the PUSCH in each retransmission, so as to further optimize a transmission effect of the random access message.

FIG. 3 is a flowchart illustrating a method for sending a random access message according to another embodiment. The method for sending a random access message may be applied in the wireless communication system illustrated in FIG. 1 and performed by the terminal illustrated in FIG. 1. The method may include the following.

At block 301, a first random access message is sent to a base station. The first random access message includes a PRACH and a PUSCH.

In an example solution, when the UE needs to access the network, a path loss may be estimated based on a measured power of a synchronizing signal block (SSB) sent by the base station in the downlink, a transmitting power of the MsgA is calculated based on a receiving power of the PRACH and the PUSCH, and the MsgA is sent to the base station.

The above MsgA may include two parts, one is the PRACH mainly including a preamble of random access, the other is the content sent in the PUSCH.

At block 302, when a second random access message of a specified type returned by the base station is received within a first specified time period, a specified content is sent to the base station.

The specified content is the content of the first random access message in the PUSCH.

Alternatively, the first random access message is the MsgA.

The above second random access message of the specified type may be the second random access message returned by the base station to the terminal when the base station successfully receives the PRACH of the first random access message but fails to parse the content of the first random access message in the PUSCH.

For example, when the first random access message is the MsgA, the above second random access message of the specified type may be the MsgB of Msg2.

At block 303, when the second random access message returned by the base station is not received within a second specified time period after the specified content is sent to the base station and the number of times of retransmission of the specified content does not reach the second number of times of retransmission, the specified content is sent to the base station repeatedly.

In the embodiment of the present disclosure, the UE may configure retransmission configurations for the random access messages of various types, respectively. For example, the first retransmission configuration is configured for the first random access message, and the second retransmission configuration is configured for the specified content in the first random access message. The first retransmission configuration is different from the second retransmission configuration.

In a possible implementation, the first retransmission configuration may include the first number of times of retransmission corresponding to the first random access message. The second retransmission configuration may include the second number of times of retransmission corresponding to the specified content. The first number of times of retransmission is different from the second number of times of retransmission.

The first number of times of retransmission may be an upper limit of the number of times of transmitting the first random access message in a single random access process. Correspondingly, the second number of times of retransmission may be an upper limit of the number of times of transmitting the specified content in a single random access process.

For example, the UE may configure counters for counting the number of times of retransmission for the random access messages of various types, respectively. For example, the first random access message is the MsgA (including the PRACH and the PUSCH), the upper limit of the counter for counting the number of times of retransmission of the MsgA may be the above first number of times of retransmission. For the above specified content, the UE may configure the upper limit of the counter for counting the number of times of retransmission as the second number of times of retransmission in advance.

Alternatively, the first number of times of retransmission is less than the second number of times of retransmission.

For example, the first random access message is the MsgA, since the probability of PARCH (i.e., preamble) collision of the MsgA is low, while the probability that the base station cannot successfully parse the content in the PUSCH of the MsgA is high, the UE may set a relative small upper limit for the number of times of retransmission of the MsgA having complete content and set a relative big upper limit for the number of times of retransmission of the specified content in the PUSCH of the MsgA, respectively, in advance in the embodiments of the present disclosure.

In a possible implementation, the first number of times of retransmission and the second number of times of retransmission mentioned above may be configured by the system through a radio resource control (RRC) signaling. For example, when the UE accesses to a serving base station, the serving base station may send configuration information to the UE through the RRC signaling, and the UE configures or updates the first number of times of retransmission and the second number of times of retransmission bases on the configuration information.

In another possible implementation, the first number of times of retransmission and the second number of times of retransmission mentioned above may be configured by the base station through a broadcast signaling. For example, before the UE initiates the random access to the base station, the UE performs listening on the broadcast channel sent by the base station, and configures or updates the first number of times of retransmission and the second number of times of retransmission bases on configuration information carried in the broadcast channel.

Alternatively, the UE may further separately configure an upper limit for the counter for counting the number of times of retransmission of the PRACH of the first random access message in advance.

For example, in an example solution, the UE may pre-define the upper limit of the counter for counting the number of times of retransmission of the PRACH of the first random access message, which may be the same as the first number of times of retransmission or the second number of times of retransmission. After the UE configures the first number of times of retransmission or the second number of times of retransmission based on the configuration information sent by the system through the RRC signaling or based on the configuration information sent by the base station through the broadcast signaling, the UE may set the first number of times of retransmission or the second number of times of retransmission as the upper limit of the counter for counting the number of times of retransmission of the PARCH of the first random access message according to predefinition.

Alternatively, in another example solution, the system may directly indicate the upper limit of the number of times of retransmission of the PRACH of the first random access message through the RRC signaling or the broadcast signaling. Correspondingly, the UE may directly configure the upper limit of the counter for counting the number of times of retransmission of the PRACH of the first random access message based on the configuration information sent by the system through the RRC signaling or based on the configuration information sent by the base station through the broadcast signaling.

Alternatively, when sending the specified content to the base station repeatedly, the terminal may perform the following: obtaining a second power adjustment step size of the specified content; obtaining an adjusted second transmitting power by adjusting a second transmitting power for sending the specified content last time based on the second power adjustment step size; and retransmitting the specified content to the base station based on the adjusted second transmitting power.

In the embodiment of the present disclosure, when the terminal determines that the base station cannot parse the above specified content, if the number of times of retransmission of the specified content does not reach the second number of times of retransmission, the terminal may adjust the transmitting power of the specified content based on a certain step size when retransmitting the specified content.

Alternatively, when adjusting the second transmitting power for sending the specified content last time based on the second power adjustment step size, the terminal may obtain the adjusted second transmitting power by adding the second power adjustment step size to the second transmitting power for sending the specified content last time.

In the embodiment of the present disclosure, when the terminal adjusts the transmitting power of the specified content, the terminal may increase the transmitting power of the specified content based on the above second power adjustment step size, so as to increase the probability that the base station successfully parses the specified content, and further improve the success rate of random access.

Alternatively, the second power adjustment step size is obtained by dividing a difference between a maximum transmitting power for the terminal sending a random access message and a transmitting power for sending the specified content for the first time by the second number of times of retransmission.

In the embodiment of the present disclosure, since the upper limit of the number of times of retransmission of the specified content (i.e., the second number of times of retransmission) is set separately, the power adjustment step size of the specified content needs to be configured separately. For example, the terminal may obtain the transmitting power for sending the specified content for the first time in the current random access process, subtracts the transmitting power for sending the specified content for the first time from the maximum transmitting power for the terminal sending the random access message, and then divides the difference by the second number of times of retransmission to obtain the second power adjustment step size for adjusting the transmitting power of the specified content. In this way, when the number of times of retransmission of the specified content reaches the second number of times of retransmission, the transmitting power reaches the maximum transmitting power for the terminal sending the random access message, such that the transmitting power of the specified content can be adjusted reasonably, thus avoiding power waste while enabling the transmission effect of the specified content.

At block 304, when the second random access message returned by the base station is not received within the first specified time period and the number of times of retransmission of the first random access message does not reach the first number of times of retransmission, the first random access message is sent to the base station repeatedly.

In the embodiment of the present disclosure, if the base station does not receive the PRACH of the first random access message (for example, MsgA), the base station does not feed the MsgB of any type back to the terminal, such that if the terminal cannot receive the MsgB returned by the base station within the first specified time period after sending the MsgA, the terminal may determine that the base station cannot successfully receive the preamble, at this time, if the number of times of transmission of the MsgA does not reach the first number of times of retransmission, the terminal may retransmit the complete MsgA.

Alternatively, when sending the first random access message to the base station repeatedly, the terminal may perform the following: obtaining a first power adjustment step size of the first random access message; obtaining an adjusted first transmitting power by adjusting a first transmitting power for sending the first random access message last time based on the first power adjustment step size; and sending the first random access message repeatedly to the base station based on the adjusted first transmitting power.

In the embodiment of the present disclosure, when the terminal determines that the base station cannot successfully receive the preamble in the first random access message, if the number of times of retransmission of the first random access message does not reach the first number of times of retransmission, the terminal may adjust the transmitting power of the first random access message based on a certain step size when retransmitting the first random access message.

Alternatively, when adjusting the first transmitting power for sending the first random access message last time based on the first power adjustment step size, the terminal may obtain the adjusted first transmitting power by adding the first power adjustment step size to the first transmitting power for sending the first random access message last time.

In the embodiment of the present disclosure, when the terminal adjusts the transmitting power of the first random access message, the terminal may increase the transmitting power of the first random access message based on the above first power adjustment step size, so as to increase the probability that the base station successfully parses the first random access message, and further improve the success rate of random access.

Alternatively, the first power adjustment step size is obtained by dividing a difference between a maximum transmitting power for the terminal sending a random access message and a transmitting power for sending the first random access message for the first time by the first number of times of retransmission.

In the embodiment of the present disclosure, since the upper limit of the number of times of retransmission of the first random access message (i.e., the first number of times of retransmission) is set separately, the power adjustment step size of the first random access message needs to be configured separately. For example, the terminal may obtain the transmitting power for sending the first random access message for the first time in the current random access process, subtracts the transmitting power for sending the first random access message for the first time from the maximum transmitting power for the terminal sending the random access message, and then divides the difference by the first number of times of retransmission to obtain the first power adjustment step size for adjusting the transmitting power of the first random access message. In this way, when the number of times of retransmission of the first random access message reaches the first number of times of retransmission, the transmitting power reaches the maximum transmitting power for the terminal sending the random access message, such that the transmitting power of the first random access message can be adjusted reasonably, thus avoiding power waste while enabling the transmission effect of the first random access message.

In an example solution, the base station may configure the counters for counting the number of times of retransmission of the random access messages of various types sent by the UE, respectively, through the RRC signaling or the broadcast signaling in advance. For example, the upper limit (corresponding to the above first number of times of retransmission) configured for the counter for counting the number of times of retransmission of the MsgA (including the PRACH and the PUSCH) is set to A, and the upper limit (corresponding to the above second number of times of retransmission) configured for the counter for counting the number of times of retransmission of the specified content of the MsgA sent on the PUSCH is set to B. Typically, A is less than B.

In addition, the upper limit configured in the UE for the counter for counting the number of times of retransmission of the PRACH of the MsgA may be A or B, which may be predefined or configured by the base station.

After the UE decides to initiate the two-step random access based on a determination condition and a configuration from the base station, the UE sends the complete MsgA (including the PRACH and the PUSCH). If no feedback is received from the base station, the UE retransmits the MsgA, until the feedback is received from the base station or the number of times of retransmission reaches A.

If the UE receives the feedback from the base station after sending the MsgA, and the feedback from the base station is the MsgB of the Msg2 type, the UE may determine that the base station successfully receives the PRACH of the MsgA but does not parse the content of the MsgA on the PUSCH successfully. In this case, the UE may separately sends the content of the MsgA on the PUSCH, until the base station feeds back the MsgB or the number of times of retransmission of the content of the MsgA on the PUSCH reaches B.

Based on upper limits of the counters for counting the number of times of retransmission of different random access messages, the UE may set the power adjustment step sizes for different random access messages, respectively.

For example, for the PRACH of the first random access message, when the upper limit of the number of times of retransmission is A, the power adjustment step size=(Pmax−the transmitting power of sending the PRACH for the first time)/A. For the MsgA, the power adjustment step size= (Pmax−the transmitting power of sending the MsgA for the first time)/A. For the content of the MsgA on the PUSCH, the power adjustment step size=(Pmax−the transmitting power of sending the PUSCH for the first time)/B.

In conclusion, according to the technical solution of the embodiment of the present disclosure, in the two-step random access process initiated by the terminal, the first random access message and the specified content of the first random access message in the PUSCH are sent through different retransmission configurations, respectively, thus realizing optimization of transmission of different message contents in the two-step random access process, and improving a resource utilization of the system.

In addition, according to the technical solution of the embodiment of the present disclosure, the numbers of times of retransmission are set for the random access messages of different types (including the complete MsgA, the specified content of the Msg A on the PUSCH, the PRACH of the MsgA), respectively, in the terminal in advance, thus achieving optimization of retransmission of messages in the random access process, and improving the system performance.

Further, according to the technical solution of the embodiment of the present disclosure, the power adjustment step sizes of the random access messages of different types are set for the upper limits of the numbers of times of retransmission of the random access messages of different types, thus achieving optimization of power control in the random access process.

The apparatus embodiments of the disclosure are described below, which may be configured to implement the method embodiments of the present disclosure. For details not described in the apparatus embodiments, reference can be made to the method embodiments.

Figure 4:
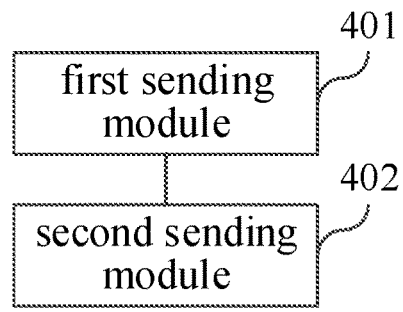
FIG. 4 is a block diagram illustrating an apparatus for sending a random access message according to an embodiment.

FIG. 4 is a block diagram illustrating an apparatus for sending a random access message according to an embodiment. As illustrated in FIG. 4, the apparatus may be implemented as all or a part of the terminal in the wireless communication system of FIG. 1 by hardware or a combination of software and hardware, to perform steps executed by the terminal in any of embodiments described with reference to FIG. 2 and FIG. 3. The apparatus s for sending a random access message may include a first sending module 401 and a second sending module 402.

The first sending module 401 is configured to send a first random access message based on a first retransmission configuration in a two-step random access process, in which the first random access message comprises a physical random access channel (PRACH) and a physical uplink shared channel (PUSCH).

The second sending module 402 is configured to send specified content based on a second retransmission configuration in response to meeting a condition of sending the specified content, in which the specified content is content of the first random access message in the PUSCH.

The first retransmission configuration is different from the second retransmission configuration.

Alternatively, the first retransmission configuration includes a first number of times of retransmission corresponding to the first random access message.

The first sending module 401 is configured to: send the first random access message to a base station repeatedly in response to not receiving a second random access message returned by the base station within a first specified time period after the first random access message is sent last time and a number of times of retransmission of the first random access message not reaching the first number of times of retransmission.

Alternatively, the first sending module 401 includes a first step size obtaining sub-module, a first power adjusting sub-module and a first sending sub-module.

The first step size obtaining sub-module is configured to obtain a first power adjustment step size of the first random access message.

The first power adjusting sub-module is configured to obtain an adjusted first transmitting power by adjusting a first transmitting power for sending the first random access message last time based on the first power adjustment step size.

The first sending sub-module is configured to send the first random access message repeatedly to the base station based on the adjusted first transmitting power.

Alternatively, the first power adjusting sub-module is configured to obtain the adjusted first transmitting power by adding the first power adjustment step size to the first transmitting power for sending the first random access message last time.

Alternatively, the first power adjustment step size is obtained by dividing a difference between a maximum transmitting power for the terminal sending a random access message and a transmitting power for sending the first random access message for the first time by the first number of times of retransmission.

Alternatively, the second sending module 402 is configured to send the specified content based on the second retransmission configuration in response to receiving the second random access message of a specified type returned by the base station within the first specified time period after the first random access message is sent last time.

The second random access message of the specified type is a message returned by the base station after successfully receiving the PRACH of the first random access message but failing to parse the content of the first random access message in the PUSCH.

Alternatively, the second retransmission configuration includes a second number of times of retransmission corresponding to the specified content, and the second number of times of retransmission is different from the first number of times of retransmission.

The second sending module 402 is configured to send the specified content to the base station repeatedly in response to not receiving the second random access message returned by the base station within a second specified time period after the specified content is sent last time and a number of times of retransmission of the specified content not reaching the second number of times of retransmission.

Alternatively, the second sending module 402 includes a second step size obtaining sub-module, a second power adjusting sub-module and a second sending sub-module.

The second step size obtaining sub-module is configured to obtain a second power adjustment step size of the specified content.

The second power adjusting sub-module is configured to obtain an adjusted second transmitting power by adjusting a second transmitting power for sending the specified content last time based on the second power adjustment step size.

The second sending sub-module is configured to retransmit the specified content to the base station based on the adjusted second transmitting power.

Alternatively, the second power adjusting sub-module module is configured to: obtain the adjusted second transmitting power by adding the second power adjustment step size to the second transmitting power for sending the specified content last time.

Alternatively, the second power adjustment step size is obtained by dividing a difference between a maximum transmitting power for the terminal sending a random access message and a transmitting power for sending the specified content for the first time by the second number of times of retransmission.

Alternatively, the first number of times of retransmission is less than the second number of times of retransmission.

In conclusion, according to the technical solution of the embodiment of the present disclosure, in the two-step random access process initiated by the terminal, the first random access message and the specified content of the first random access message in the PUSCH are sent through different retransmission configurations, respectively, thus realizing optimization of transmission of different message contents in the two-step random access process, and improving a resource utilization of the system.

In addition, according to the technical solution of the embodiment of the present disclosure, the numbers of times of retransmission are set for the random access messages of different types (including the complete MsgA, the specified content of the Msg A on the PUSCH, the PRACH of the MsgA), respectively, in the terminal in advance, thus achieving optimization of retransmission of messages in the random access process, and improving the system performance.

Further, according to the technical solution of the embodiment of the present disclosure, the power adjustment step sizes of the random access messages of different types are set for the upper limits of the numbers of times of retransmission of the random access messages of different types, thus achieving optimization of power control in the random access process.

It should be noted that, when the apparatus provided in the above embodiment realizes its functions, the division of the above functional modules is only used as an example for illustration. In practical applications, the above functions can be allocated to different functional modules according to actual needs. That is, the structure of the apparatus is divided into different functional modules to complete all or part of the functions described above.

Regarding the apparatus in the above-mentioned embodiments, the specific manner in which each module performs operations has been described in detail in the method embodiments, and will not be described in detail here.

An embodiment of the present disclosure provides a device for sending a random access message, which may implement all or a part of steps executed by a terminal in the embodiment described with reference to FIG. 2 or FIG. 3. The device for sending a random access message may include a processor, a memory configured to store executable instructions.

The processor is configured to perform the following: sending a first random access message based on a first retransmission configuration in a two-step random access process, in which the first random access message comprises a physical random access channel (PRACH) and a physical uplink shared channel (PUSCH); and sending specified content based on a second retransmission configuration in response to meeting a condition of sending the specified content, in which the specified content is content of the first random access message in the PUSCH. The first retransmission configuration is different from the second retransmission configuration.

Alternatively, the first retransmission configuration includes a first number of times of retransmission corresponding to the first random access message, and sending the first random access message based on the first retransmission configuration includes: sending the first random access message to a base station repeatedly in response to not receiving a second random access message returned by the base station within a first specified time period after the first random access message is sent last time and a number of times of retransmission of the first random access message not reaching the first number of times of retransmission.

Alternatively, sending the first random access message to the base station repeatedly includes: obtaining a first power adjustment step size of the first random access message; obtaining an adjusted first transmitting power by adjusting a first transmitting power for sending the first random access message last time based on the first power adjustment step size; and sending the first random access message repeatedly to the base station based on the adjusted first transmitting power.

Alternatively, obtaining the adjusted first transmitting power by adjusting the first transmitting power for sending the first random access message last time based on the first power adjustment step size includes: obtaining the adjusted first transmitting power by adding the first power adjustment step size to the first transmitting power for sending the first random access message last time.

Alternatively, the first power adjustment step size is obtained by dividing a difference between a maximum transmitting power for the terminal sending a random access message and a transmitting power for sending the first random access message for the first time by the first number of times of retransmission.

Alternatively, sending the specified content based on the second retransmission configuration in response to meeting the condition of sending the specified content includes: sending the specified content based on the second retransmission configuration in response to receiving the second random access message of a specified type returned by the base station within the first specified time period after the first random access message is sent last time.

The second random access message of the specified type is a message returned by the base station after successfully receiving the PRACH of the first random access message but failing to parse the content of the first random access message in the PUSCH.

Alternatively, the second retransmission configuration includes a second number of times of retransmission corresponding to the specified content, and the second number of times of retransmission is different from the first number of times of retransmission.

Sending the specified content based on the second retransmission configuration includes: sending the specified content to the base station repeatedly in response to not receiving the second random access message returned by the base station within a second specified time period after the specified content is sent last time and a number of times of retransmission of the specified content not reaching the second number of times of retransmission.

Alternatively, sending the specified content to the base station repeatedly includes: obtaining a second power adjustment step size of the specified content; obtaining an adjusted second transmitting power by adjusting a second transmitting power for sending the specified content last time based on the second power adjustment step size; and retransmitting the specified content to the base station based on the adjusted second transmitting power.

Alternatively, obtaining the adjusted second transmitting power by adjusting the second transmitting power for sending the specified content last time based on the second power adjustment step size includes: obtaining the adjusted second transmitting power by adding the second power adjustment step size to the second transmitting power for sending the specified content last time.

Alternatively, the second power adjustment step size is obtained by dividing a difference between a maximum transmitting power for the terminal sending a random access message and a transmitting power for sending the specified content for the first time by the second number of times of retransmission.

Alternatively, the first number of times of retransmission is less than the second number of times of retransmission.

In conclusion, according to the technical solution of the embodiment of the present disclosure, in the two-step random access process initiated by the terminal, the first random access message and the specified content of the first random access message in the PUSCH are sent through different retransmission configurations, respectively, thus realizing optimization of transmission of different message contents in the two-step random access process, and improving a resource utilization of the system.

In addition, according to the technical solution of the embodiment of the present disclosure, the numbers of times of retransmission are set for the random access messages of different types (including the complete MsgA, the specified content of the Msg A on the PUSCH, the PRACH of the MsgA), respectively, in the terminal in advance, thus achieving optimization of retransmission of messages in the random access process, and improving the system performance.

Further, according to the technical solution of the embodiment of the present disclosure, the power adjustment step sizes of the random access messages of different types are set for the upper limits of the numbers of times of retransmission of the random access messages of different types, thus achieving optimization of power control in the random access process.

The technical solutions of the embodiments of the present disclosure are described mainly taking the terminal and the base station as examples. It should be understood that, in order to implement the above functions, the terminal and the base station include the corresponding hardware structure and/or software modules for performing the respective functions. In combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 5:
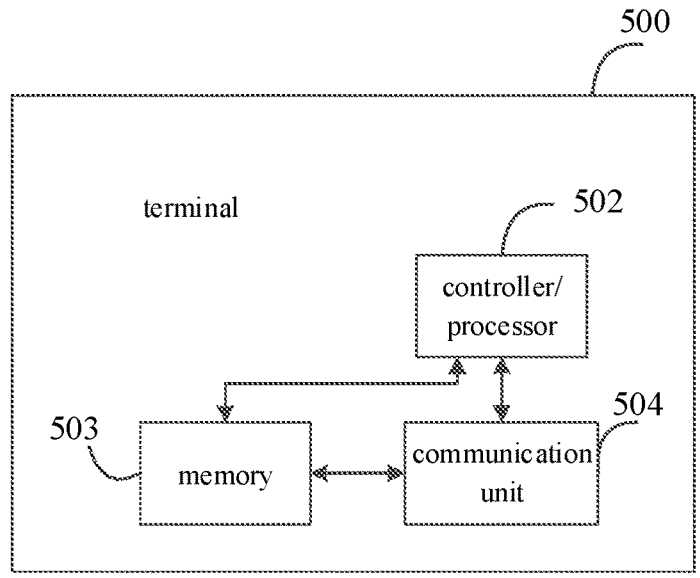
FIG. 5 is a block diagram illustrating a terminal according to an embodiment.

FIG. 5 is a block diagram of a terminal according to an embodiment.

As illustrated in FIG. 5, the terminal 500 includes a communication unit 504 and a processor 502. The processor 502 may be a controller, and is denoted as "controller/processor 502" in FIG. 5. The communication unit 504 is configured to support communication between the terminal and other network devices (for example, base stations etc.)

Further, the terminal 500 further includes a memory 503 configured to store program codes and data of the terminal 500.

It should be understood that, FIG. 5 only illustrates a simplified design of the terminal 500. In practical applications, the terminal 500 may include any number of processors, controllers, memories, communication units, etc., and all access network devices that may be implemented in embodiments of the present disclosure are within the protection scope of embodiments of the present disclosure.

Those skilled may realize that in one or more examples, the functions described in embodiments of the disclosure may be implemented with a hardware, a software, a firmware and their combination. The functions may be stored in a computer readable storage medium or transmitted as one or more instructions or codes on a computer readable medium when implemented with a software. Computer-readable media include a computer storage medium and a communication medium, in which the communication medium includes any medium that facilitates transmission of a computer program from one place to another. A storage medium may be any available medium that may be accessed by a general purpose or special purpose computer.

Embodiments of the disclosure further provide a computer storage medium configured to store computer software instructions for use in the above base station, the instructions including a program designed to perform the above method for sending a random access message.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

What is claimed is:

1. A method for sending a random access message, comprising:
   sending, by a terminal, a first random access message based on a first retransmission configuration in a two-step random access process, wherein the first random access message comprises a physical random access channel (PRACH) and a physical uplink shared channel (PUSCH); and
   sending, by the terminal, specified content based on a second retransmission configuration in response to meeting a condition of sending the specified content, wherein the specified content is content of the first random access message in the PUSCH;

wherein the first retransmission configuration is different from the second retransmission configuration.

2. The method of claim 1, wherein the first retransmission configuration comprises a first number of times of retransmission corresponding to the first random access message, and sending the first random access message based on the first retransmission configuration comprises:

sending the first random access message to a base station repeatedly in response to not receiving a second random access message returned by the base station within a first specified time period after the first random access message is sent last time and a number of times of retransmission of the first random access message not reaching the first number of times of retransmission.

3. The method of claim 2, wherein sending the first random access message to the base station repeatedly comprises:

obtaining a first power adjustment step size of the first random access message;

obtaining an adjusted first transmitting power by adjusting a first transmitting power for sending the first random access message last time based on the first power adjustment step size; and sending the first random access message repeatedly to the base station based on the adjusted first transmitting power.

4. The method of claim 3, wherein obtaining the adjusted first transmitting power by adjusting the first transmitting power for sending the first random access message last time based on the first power adjustment step size comprises:

obtaining the adjusted first transmitting power by adding the first power adjustment step size to the first transmitting power for sending the first random access message last time.

5. The method of claim 3, wherein the first power adjustment step size is obtained by dividing a difference between a maximum transmitting power for the terminal sending a random access message and a transmitting power for sending the first random access message for the first time by the first number of times of retransmission.

6. The method of claim 2, wherein sending the specified content based on the second retransmission configuration in response to meeting the condition of sending the specified content comprises:

sending the specified content based on the second retransmission configuration in response to receiving the second random access message of a specified type returned by the base station within the first specified time period after the first random access message is sent last time;

wherein the second random access message of the specified type is a message returned by the base station after successfully receiving the PRACH of the first random access message but failing to parse the content of the first random access message in the PUSCH.

7. The method of claim 6, wherein the second retransmission configuration comprises a second number of times of retransmission corresponding to the specified content, and the second number of times of retransmission is different from the first number of times of retransmission;

wherein sending the specified content based on the second retransmission configuration comprises:

sending the specified content to the base station repeatedly in response to not receiving the second random access message returned by the base station within a second specified time period after the specified content is sent last time and a number of times of retransmission of the specified content not reaching the second number of times of retransmission.

8. The method of claim 7, wherein sending the specified content to the base station repeatedly comprises:

obtaining a second power adjustment step size of the specified content;

obtaining an adjusted second transmitting power by adjusting a second transmitting power for sending the specified content last time based on the second power adjustment step size; and retransmitting the specified content to the base station based on the adjusted second transmitting power.

9. The method of claim 8, wherein obtaining the adjusted second transmitting power by adjusting the second transmitting power for sending the specified content last time based on the second power adjustment step size comprises:

obtaining the adjusted second transmitting power by adding the second power adjustment step size to the second transmitting power for sending the specified content last time.

10. The method of claim 8, wherein the second power adjustment step size is obtained by dividing a difference between a maximum transmitting power for the terminal sending a random access message and a transmitting power for sending the specified content for the first time by the second number of times of retransmission.

11. The method of claim 7, wherein the first number of times of retransmission is less than the second number of times of retransmission.

12. A device for sending a random access message, applied in a terminal, comprising:

a processor;

a memory storing executable instructions thereon; wherein, the processor is configured to perform the following:

sending a first random access message based on a first retransmission configuration in a two-step random access process, wherein the first random access message comprises a physical random access channel (PRACH) and a physical uplink shared channel (PUSCH); and sending specified content based on a second retransmission configuration in response to meeting a condition of sending the specified content, wherein the specified content is content of the first random access message in the PUSCH;

wherein the first retransmission configuration is different from the second retransmission configuration.

13. A non-transitory computer-readable storage medium stored with executable instructions thereon, wherein the executable instructions are loaded and executed by a processor in a base station, to perform the method for sending a random access message, comprising:

sending a first random access message based on a first retransmission configuration in a two-step random access process, wherein the first random access message comprises a physical random access channel (PRACH) and a physical uplink shared channel (PUSCH); and sending specified content based on a second retransmission configuration in response to meeting a condition of sending the specified content, wherein the specified content is content of the first random access message in the PUSCH;

wherein the first retransmission configuration is different from the second retransmission configuration.

14. The device of claim 12, wherein the first retransmission configuration comprises a first number of times of retransmission corresponding to the first random access message, and sending the first random access message based on the first retransmission configuration comprises:
- sending the first random access message to a base station repeatedly in response to not receiving a second random access message returned by the base station within a first specified time period after the first random access message is sent last time and a number of times of retransmission of the first random access message not reaching the first number of times of retransmission.

15. The device of claim 14, wherein sending the first random access message to the base station repeatedly comprises:
- obtaining a first power adjustment step size of the first random access message;
- obtaining an adjusted first transmitting power by adjusting a first transmitting power for sending the first random access message last time based on the first power adjustment step size; and
- sending the first random access message repeatedly to the base station based on the adjusted first transmitting power.

16. The device of claim 15, wherein obtaining the adjusted first transmitting power by adjusting the first transmitting power for sending the first random access message last time based on the first power adjustment step size comprises:
- obtaining an adjusted first transmitting power by adding the first power adjustment step size to the first transmitting power for sending the first random access message last time.

17. The device of claim 15, wherein the first power adjustment step size is obtained by dividing a difference between a maximum transmitting power for the terminal sending a random access message and a transmitting power for sending the first random access message for the first time by the first number of times of retransmission.

18. The device of claim 14, wherein sending the specified content based on the second retransmission configuration in response to meeting the condition of sending the specified content comprises:
- sending the specified content based on the second retransmission configuration in response to receiving the second random access message of a specified type returned by the base station within the first specified time period after the first random access message is sent last time;
- wherein the second random access message of the specified type is a message returned by the base station after successfully receiving the PRACH of the first random access message but failing to parse the content of the first random access message in the PUSCH.

19. The device of claim 18, wherein the second retransmission configuration comprises a second number of times of retransmission corresponding to the specified content, and the second number of times of retransmission is different from the first number of times of retransmission;
- wherein sending the specified content based on the second retransmission configuration comprises:
- sending the specified content to the base station repeatedly in response to not receiving the second random access message returned by the base station within a second specified time period after the specified content is sent last time and a number of times of retransmission of the specified content not reaching the second number of times of retransmission.

20. The device of claim 19, wherein sending the specified content to the base station repeatedly comprises:
- obtaining a second power adjustment step size of the specified content;
- obtaining an adjusted second transmitting power by adjusting a second transmitting power for sending the specified content last time based on the second power adjustment step size; and
- retransmitting the specified content to the base station based on the adjusted second transmitting power.

\* \* \* \* \*